US012055639B2

United States Patent
Mao et al.

(10) Patent No.: US 12,055,639 B2
(45) Date of Patent: Aug. 6, 2024

(54) GLOBAL NAVIGATION SATELLITE SYSTEM INTEGRATED CIRCUIT AND ASSOCIATED COMMUNICATION SYSTEM AND ASSOCIATED IDENTIFICATION AND POSITIONING METHOD

(71) Applicant: Airoha Technology Corp., Hsinchu (TW)

(72) Inventors: Jen-Hao Mao, Hsinchu (TW); Tz-Chiau Su, Hsinchu (TW); I-Jung Wu, Hsinchu (TW)

(73) Assignee: AIROHA TECHNOLOGY CORP., Hsinchu (TW)

( * ) Notice: Subject to any disclaimer, the term of this patent is extended or adjusted under 35 U.S.C. 154(b) by 319 days.

(21) Appl. No.: 17/567,460

(22) Filed: Jan. 3, 2022

(65) Prior Publication Data
US 2022/0326388 A1 Oct. 13, 2022

(30) Foreign Application Priority Data
Apr. 13, 2021 (CN) .......................... 202110395263.7

(51) Int. Cl.
*G01S 19/01* (2010.01)
*G01S 19/08* (2010.01)
*G01S 19/25* (2010.01)

(52) U.S. Cl.
CPC ............ *G01S 19/015* (2013.01); *G01S 19/08* (2013.01); *G01S 19/258* (2013.01)

(58) Field of Classification Search
CPC ....... G01S 19/015; G01S 19/08; G01S 19/258
See application file for complete search history.

(56) References Cited

U.S. PATENT DOCUMENTS

| 10,768,309 | B1 | 9/2020 | Alexander |
| 2014/0327573 | A1* | 11/2014 | Leibner ................. G01S 19/215 |
| | | | 342/357.59 |
| 2017/0299724 | A1* | 10/2017 | Hsu ........................ G01S 19/05 |
| 2017/0357009 | A1 | 12/2017 | Raab et al. |

(Continued)

FOREIGN PATENT DOCUMENTS

| CN | 109581426 A | 4/2019 |
| CN | 112055821-4 | 12/2020 |
| WO | WO 2019/236778 A1 | 12/2019 |

OTHER PUBLICATIONS

English Translation of Search Report issued in TW priority application 110113144, completed on Nov. 23, 2021.

*Primary Examiner* — Bernarr E Gregory
*Assistant Examiner* — Hailey R Le
(74) *Attorney, Agent, or Firm* — Birch, Stewart, Kolasch & Birch, LLP

(57) ABSTRACT

An embodiment of the present application discloses a global navigation satellite system (GNSS) integrated circuit (IC). The GNSS IC includes a GNSS module, a memory and a processor. The GNSS module is arranged operably to receive a to-be-identified broadcast GNSS signal. The memory is arranged operably to store a plurality of ephemeris aiding data candidates, wherein the ephemeris aiding data candidates are not provided by the GNSS module. The processor is arranged operably to determine whether the to-be-identified broadcast GNSS signal is a spoofing signal based on an ephemeris aiding data reference in the ephemeris aiding data candidates.

18 Claims, 6 Drawing Sheets

(56) References Cited

U.S. PATENT DOCUMENTS

| | | | | |
|---|---|---|---|---|
| 2020/0326190 A1* | 10/2020 | Miyao | ................ | G01S 19/48 |
| 2020/0371246 A1* | 11/2020 | Marmet | ................ | G01S 5/0009 |
| 2021/0255332 A1* | 8/2021 | Kowada | ................ | G01S 19/256 |
| 2023/0417926 A1* | 12/2023 | Mueller | ................ | G01S 19/215 |

* cited by examiner

| Day 1 | Day 2 | Day 3 | Day 4 | ... | Day 15 |

FIG. 3A

| Segment 1 | Segment 2 | Segment 3 | Segment 4 |
| 00:00~06:00 | 06:00~12:00 | 12:00~18:00 | 18:00~24:00 |

FIG. 3B

| SV1 | SV2 | SV3 | SV4 | ... | SV32 |

FIG. 3C

| 1 | 2 | 3 | 4 | 5 | ... | 67 | 68 | ... | 72 |

GNSS Time ID — Ephemeris Data — Checksum

FIG. 3D

GLOBAL NAVIGATION SATELLITE SYSTEM INTEGRATED CIRCUIT AND ASSOCIATED COMMUNICATION SYSTEM AND ASSOCIATED IDENTIFICATION AND POSITIONING METHOD

CROSS-REFERENCE TO RELATED APPLICATIONS

This application claims the benefit of priority to Patent Application No. 202110395263.7, filed in China on Apr. 13, 2021; the entirety of which is incorporated herein by reference for all purposes.

BACKGROUND

The disclosure generally relates to global navigation satellite system (GNSS) integrated circuit (IC) and, more particularly, to a GNSS IC, an associated communication system, and an associated identification and positioning method with capability of identifying fraudulent signals.

Nowadays, the application of GNSS has become widespread. For example, electronic devices can use GNSS for positioning. However, once the electronic device is attacked by a spoofing signal from a malicious third party, the positioning result of the electronic device would be different from the real location of the electronic device. The existing signal identification methods still have certain shortcomings. Therefore, without significantly increasing the design cost, improving the ability to recognize spoofing signals has become one of the urgent problems in this field.

SUMMARY

An embodiment of the present application discloses a global navigation satellite system (GNSS) integrated circuit (IC). The GNSS IC includes a GNSS module, a memory and a processor. The GNSS module is arranged operably to receive a to-be-identified broadcast GNSS signal. The memory is arranged operably to store a plurality of ephemeris aiding data candidates, wherein the ephemeris aiding data candidates are not provided by the GNSS module. The processor is arranged operably to determine whether the to-be-identified broadcast GNSS signal is a spoofing signal based on an ephemeris aiding data reference in the ephemeris aiding data candidates.

An embodiment of the present application discloses a communication system including an antenna and the aforementioned GNSS IC.

An embodiment of the present invention discloses an identification and positioning method, performed by a GNSS IC, comprising: providing a plurality of ephemeris aiding data candidates, wherein the ephemeris aiding data candidates are not provided by a GNSS module; receiving a to-be-identified broadcast GNSS signal; and determining whether the to-be-identified broadcast GNSS signal is a spoofing signal based on an ephemeris aiding data reference in the ephemeris aiding data candidates.

Both the foregoing general description and the following detailed description are examples and for the explanatory purpose only, but are not limited to the invention as claimed.

BRIEF DESCRIPTION OF THE DRAWINGS

FIG. 3A is a schematic diagram of the data format for a data packet containing multiple ephemeris aiding data candidates in the present application.

FIG. 3B is a schematic diagram of the data format for a specific day of the 15 days shown in FIG. 3A in the present application.

FIG. 3C is a schematic diagram of the data format for one specific of four segments shown in FIG. 3B in the present application.

FIG. 3D is a schematic diagram of the data format for data of the specific one of 32 satellites shown in FIG. 3C in the present application.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto. It is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or having intermediated elements may be presented between the connected/coupled elements. In contrast, when an element is referred to as being "directly connected" or "directly coupled" to another element, there are no intermediated elements presented. Other words described the relationship between elements should be interpreted in a like fashion (e.g., "between" versus "directly between," "adjacent" versus "directly adjacent." etc.)

Figure 1:
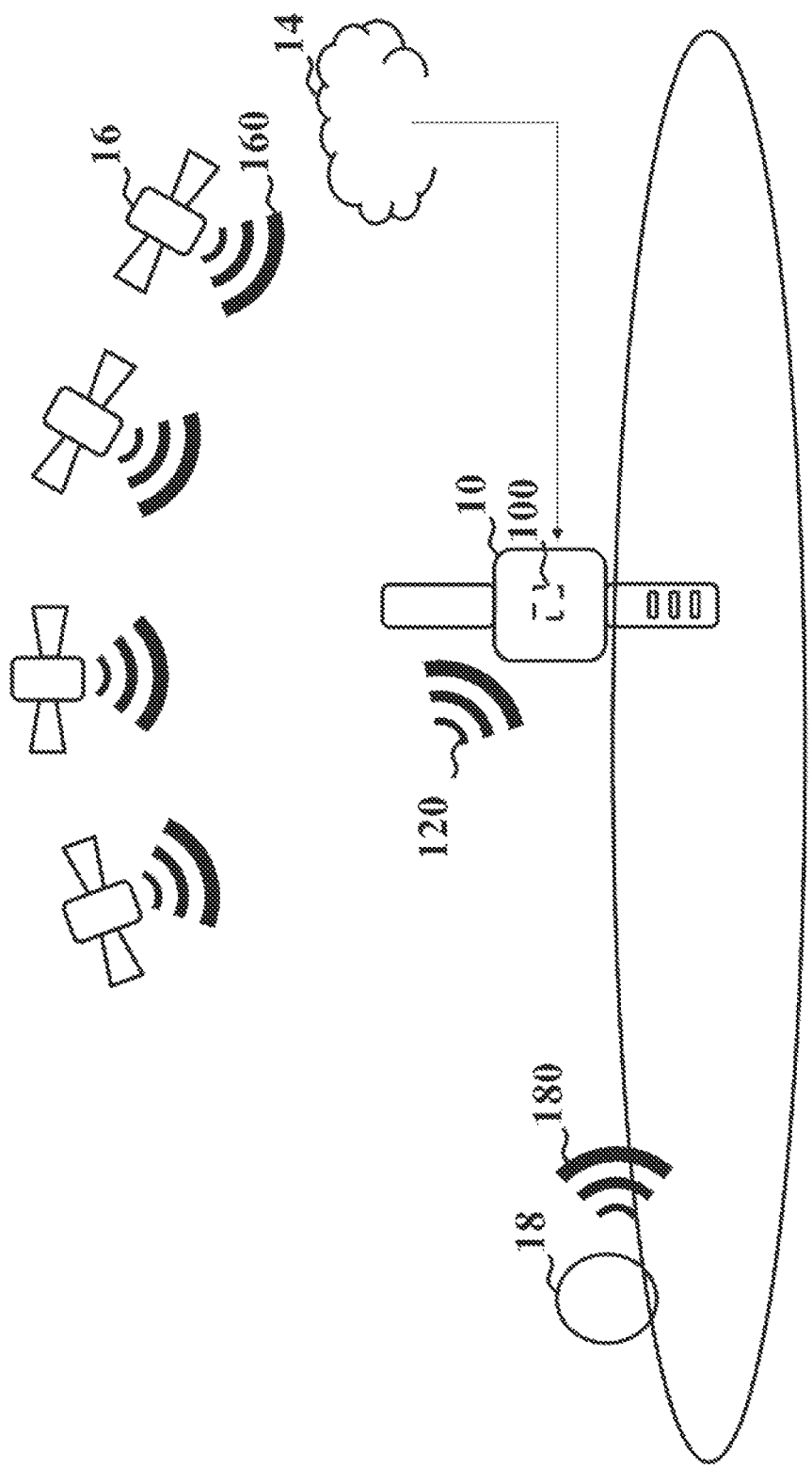
FIG. 1 is a schematic diagram of positioning by an electronic device applying a global navigation satellite system (GNSS) in the present application.

FIG. 1 is a schematic diagram of positioning by the electronic device 10 applying a global navigation satellite system (GNSS) in the present application. GNSS includes, but is not limited to, global positioning system (GPS), global navigation satellite system (GLONASS), BeiDou navigation satellite system (BDS), Galileo navigation satellite system (Galileo), navigation with India constellation (NAVIC), or Quasi-Zenith satellite system (QZSS). The electronic device 10 is, for example, a wearable device, and the wearable device includes, but is not limited to, a smart watch, or a smart bracelet.

Referring to FIG. 1, the electronic device 10 receives the broadcast GNSS signal 120 to be identified, and determines whether the to-be-identified broadcast GNSS signal 120 is the broadcast GNSS 160 from the satellite 16 or the spoofing signal 180 from the attacker 18 based on the ephemeris aiding data provided by the reliable source 14. In some embodiments, the reliable source 14 is a web server held by MediaTek Inc., and the ephemeris aiding data is extended prediction orbit (EPO) data, but the disclosure is not limited thereto. In alternative embodiments, the reliable source 14 may be a reliable website other than the web server held by MediaTek Inc.

Since the ephemeris adding data is relatively easy to obtain, the identification of attack based on the ephemeris aiding data would not significantly increase the design cost.

In the existing identification approaches, regardless of software or hardware identification, they are relatively complicated and cause relatively high design cost, as described below.

The software identification includes, for example: (a) using a cryptographic authentication mechanism; and (b) based on the difference between the 'true' GNSS signals received earlier and the GNSS signals received later to identify whether the GNSS signals are spoofed. For example, for the second methodology, in order to spoof the receiver, the attacker will broadcast the spoofing GNSS signals with larger signal strengths, as compared with the 'true' ones from satellites, because the receiver usually will acquire/track the signals with larger signal strengths. Because of the variation of signal strengths (i.e., from the true ones to the spoofing ones), the automatic gain control (AGC) of the receiver will do the corresponding gain adjustment automatically to keep suitable output based on the received signals. Based on the variations of AGC, it can at least identify that the GNSS signal received later does not come from a satellite, i.e., the GNSS signal received later may come from an attacker. In accordance with a similar principle, the noise floor, the number of satellites in operation, the quality of the peak, or the navigation information may be served as a basis to identify whether it is under attack.

The hardware identification includes, for example: (a) using an antenna array; and (b) based on the movement of a GNSS receiver to identify whether it has been attacked. As to Approach (a), furthermore, because the arriving angles of the spoofing signals from the attacker are essentially smaller than the angles of the broadcast GNSS signals from satellites received by the antenna array, the angle difference can be used to identify whether the receiver is under attack. As to Approach (b), furthermore, the locations before and after the movement of a GNSS receiver should be different. If they are the same, it means that the receiver may be attacked.

The communication system 100 of the electronic device 10 when determining that the to-be-identified broadcast GNSS signal 120 is the broadcast GNSS signal 160 from the satellite 16 performs positioning based on the broadcast GNSS signal 160. On the contrary, the communication system 100 of the electronic device 10 when determining that the to-be-identified broadcast GNSS signal 120 is the spoofing signal 180 from the attacker 18 performs positioning based on the ephemeris aiding data provided by the reliable source 14. Details are to be described below.

Figure 2:
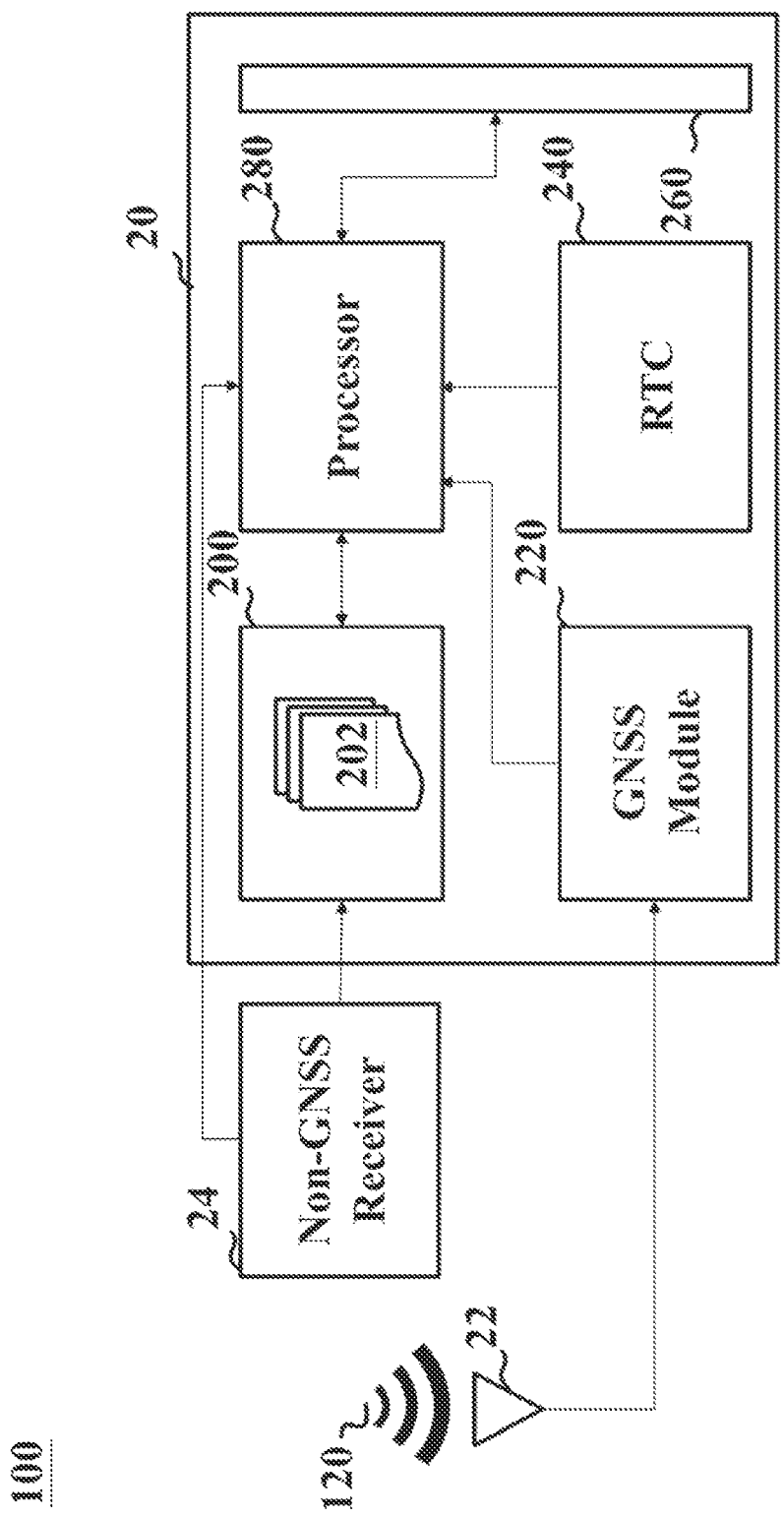
FIG. 2 is a block diagram of the communication system shown in FIG. 1 in the present application.

FIG. 2 is a block diagram of the communication system 100 shown in FIG. 1 in the present application. Referring to FIG. 2, the communication system 100 includes the GNSS integrated circuit (IC) 20, the antenna 22 and the non-GNSS receiver 24.

The non-GNSS receiver 24 is coupled to the GNSS IC 20 for receiving data packets of multiple ephemeris aiding data candidates 202, and providing the ephemeris aiding data candidates 202 to the GNSS IC 20. In some embodiments, the non-GNSS receiver 24 is further used to provide a valid time period with each candidate ephemeris aiding datum to the GNSS IC 20. In some embodiments, the non-GNSS receiver 24 includes a Wi-Fi receiver, a Bluetooth receiver, or a long term evolution (LTE) receiver.

Although the embodiments describe that the GNSS IC 20 and the non-GNSS receiver 24 are independent electronic components, the disclosure is not limited thereto. In alternative embodiments, the GNSS IC 20 and the non-GNSS receiver 24 may be integrated into a single IC.

The GNSS IC 20 includes a memory 200, a GNSS module 220, a real-time clock (RTC) 240, a transmission interface 260, and a processor 280.

The memory 200 stores the multiple ephemeris aiding data candidates 202 provided by the non-GNSS receiver 24 or the transmission interface 260. In other words, the multiple ephemeris aiding data candidates 202 are not provided by the GNSS module 220. In some embodiments, the memory 200 includes volatile memory and non-volatile memory. The volatile memory includes such as a dynamic random access memory (DRAM), a static random access memory (SRAM), etc. The non-volatile memory includes such as a mask read only memory (ROM), an erasable programmable read only memory (EPROM), an electrically-erasable programmable read-only memory (EEPROM), a flash memory, etc.

The GNSS module 220 receives the to-be-identified GNSS signal 120 through the antenna 22, obtains navigation messages by decoding the to-be-identified GNSS signal 120, and provides the navigation messages to the processor 280. In some embodiments, the GNSS module 220 includes a radio frequency (RF) circuit and a baseband processor.

The RTC 240 provides clock time to the processor 280. Usually, once a general GNSS receiver has successfully positioned based on satellites' measurements, the clock time of the general GNSS receiver is synchronized to the time reference of the satellites. Accordingly, the synchronized clock time is considered as a valid clock time. Based on this principle, if the GNSS IC 20 hasn't been positioned with the satellite 16, the clock time provided by the RTC 240 is considered as an invalid clock time. On the contrary, once the GNSS IC 20 has successfully positioned with the satellite 16, the clock time provided by the RTC 240 is synchronized to the time reference of the satellite 16. Accordingly, the synchronized clock time is considered as a valid clock time, and as a valid time.

The transmission interface 260 in some embodiments provides a valid time to the processor 280. Moreover, a user may obtain the valid time from such as a network time protocol server, etc., and provides the valid time to the processor 280 through the transmission interface 260. In some embodiments, the transmission interface 260 additionally provides the multiple ephemeris aiding data candidates 202. In some embodiments, the transmission interface 260 includes such as serial peripheral interface (SPI), secure digital input and output (SDIO), inter integrated circuit (I2C), universal asynchronous receiver-transmitter (UART), etc.

The processor 280 considers any of the valid times provided by the non-GNSS receiver 24, the RTC 240 and the transmission interface 260 as a valid-time reference. The processor 280 determines whether the to-be-identified broadcast GNSS signal 120 is a spoofing signal based on the valid-time reference and one of the multiple ephemeris aiding data candidates 202 as a reference. It will be described in detail in the embodiments with FIGS. 4 to 6. In some embodiments, the processor 280 includes a microcontroller unit (MCU).

In order to understand how to make a judgment based on the ephemeris aiding data candidates 202 easily, details of the data format of a data packet containing multiple ephemeris aiding data candidates 202 are illustrated with FIGS. 3A to 3D.

FIG. 3A is a schematic diagram of the data format for a data packet containing multiple ephemeris aiding data candidates 202 in the present application. Referring to FIG. 3A, the data packet includes data on day 1, day 2, day 3 up to day 15, totaling 15 days. In the disclosure, the data packet is limited to the data of 15 days, and in alternative embodiments, the data packet may contain data more or less than 15 days.

FIG. 3B is a schematic diagram of the data format for a specific day of the 15 days shown in FIG. 3A in the present application. Referring to FIG. 3B, the data of one day includes the data of Segment 1, Segment 2, Segment 3, and Segment 4, totaling 4 segments. Segment 1 corresponds to the time range from 00:00 to 06:00 and is used as the first ephemeris aiding data candidate among the multiple ephemeris aiding data candidates 202; Segment 2 corresponds to the time range from 06:00 to 12:00 and is used as the second ephemeris aiding data candidate among the multiple ephemeris aiding data candidates 202; Segment 3 corresponds to the time range from 12:00 to 18:00 and is used as the third ephemeris aiding data candidate among the multiple ephemeris aiding data candidates 202; and Segment 4 corresponds to the time range from 18:00 to 24:00 and is used as the fourth ephemeris aiding data candidate among the multiple ephemeris aiding data candidates 202.

In the embodiments, the valid period of each segment is six hours, but the disclosure is not limited thereto. In alternative embodiments, a time period other than six hours may be used as the valid period for a segment.

FIG. 3C is a schematic diagram of the data format for one specific of four sections shown in FIG. 3B in the present application. Referring to FIG. 3C, data in one section includes data of satellites SV1, SV2, SV3 up to SV32, totaling 32 satellites. However, the number of satellites in the disclosure is not limited thereto, and in alternative embodiments, the number of satellites may be an arbitrary number, depending on the GNSS constellation and the availability of the data.

FIG. 3D is a schematic diagram of the data format for data of the specific one of 32 satellites shown in FIG. 3C in the present application. Referring to FIG. 3D, the data length for one satellite is 72 bytes. The $0^{th}$ to the $2^{nd}$ bytes indicate a GNSS time, the $3^{rd}$ byte indicates an identification (ID) of a satellite, the $4^{th}$ to the $67^{th}$ bytes indicate content of ephemeris data, the $68^{th}$ to the $72^{th}$ bytes indicate a checksum of the data format. The ephemeris data (in the $4^{th}$ to the $67^{th}$ bytes) includes, but is not limited to, Keplerian parameters.

After explaining the data format shown in FIGS. 3A to 3D, it will be explained how to identify whether the communication system is attacked based on the ephemeris aiding data candidates 202.

Figure 4:
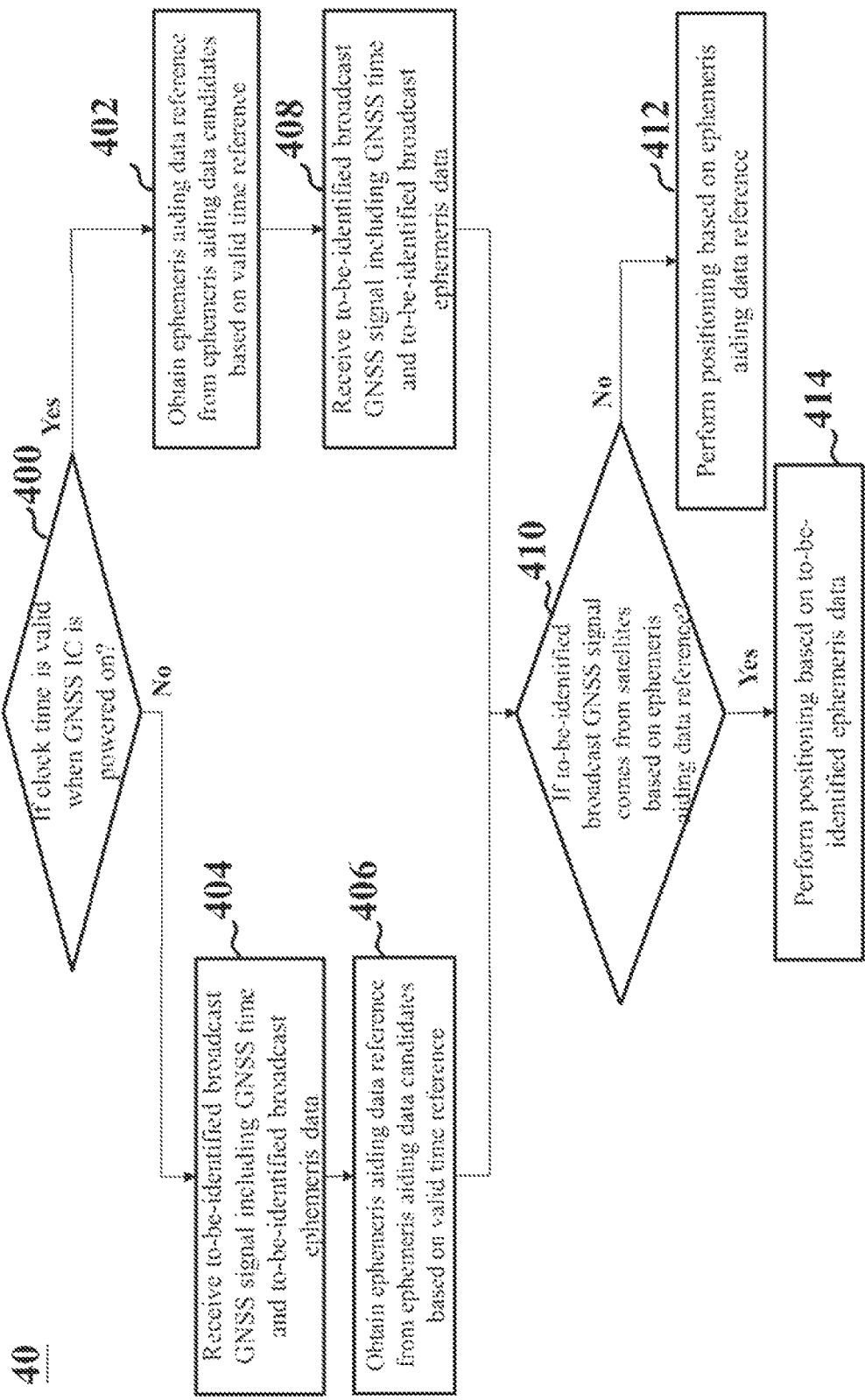
FIG. 4 is a flowchart illustrating an identification and positioning method in the present application.

FIG. 4 is a flowchart illustrating an identification and positioning method 40 in the present application. Referring to FIG. 4, the identification and positioning method 40 includes operations 400, 402, 404, 406, 408, 410, 412, and 414.

In operation 400, when the GNSS IC 20 is powered on, the processor 280 determines whether the clock time is, valid. In some applications, if the GNSS IC has successfully positioned with the satellite 16, then the clock time provided by the RTC 240 is synchronized to the time reference of the satellite 16 as a valid clock time; otherwise, if the GNSS IC 20 hasn't been positioned with the satellite 16, then the clock time provided by the RTC 240 is regarded as an invalid clock time. However, the reason for the clock time being invalid is not limited to the above scheme. When the clock time is valid, the identification and positioning method 40 proceeds to operation 402. When the clock time is invalid, the identification and positioning method 40 proceeds to operation 404.

In operation 404, the GNSS module 220 receives the to-be-identified broadcast GNSS signal 120. Similar to the ephemeris aiding data candidates 202 shown in FIG. 3B, the content of to-be-identified broadcast GNSS signal 120 includes a GNSS time and to-be-identified broadcast ephemeris data. For ease of understanding, it is assumed that the time indicated by the GNSS time of the to-be-identified broadcast GNSS signal 120 is 12:30.

In operation 406, the processor 280 considers the GNSS time 12:30 as a valid time reference, The processor 280 obtains ephemeris aiding data reference from the multiple ephemeris aiding data candidates 202 based on the valid time reference 12:30. Specifically, referring back to FIG. 3B, since the valid time reference 12:30 falls within the time range of Segment 3, the processor 280 treats the ephemeris aiding data candidate 202 in Segment 3 as the ephemeris aiding data reference.

In operation 402, the valid clock time, for example, is 12:30. The processor 280 treats 12:30 as a valid time reference. The processor 280 obtains ephemeris aiding data reference from the multiple ephemeris aiding data candidates 202 based on the valid time reference 12:30. Specifically, referring back to FIG. 3B, since the valid time reference 12:30 falls within the time range of Segment 3, the processor 280 treats the ephemeris aiding data candidates 202 in Segment 3 as the ephemeris aiding data reference.

In operation 408, the GNSS module 220 receives the to-be-identified broadcast GNSS signal 120. Different from operation 404, the processor 280 does not consider the GNSS time of the of the to-be-identified broadcast GNSS signal 120 as a valid time reference.

In operation 410, the processor 280 determines whether the to-be-identified broadcast GNSS signal 120 comes from the satellite 16 based on the ephemeris aiding data reference in Segment 3, Specifically, in an implementation, the processor 280 determines that the to-be-identified broadcast GNSS signal 120 is a spoofing signal when the difference between a parameter of the ephemeris aiding data reference of Segment 3 and the same parameter of the to-be-identified ephemeris data in the to-be-identified broadcast GNSS signal 120 is greater than a threshold. When the difference is greater than the threshold, the processor 280 determines that an attack event in which the to-be-identified broadcast GNSS signal 120 is the spoofing signal 180 has occurred, i.e., the to-be-identified broadcast GNSS signal 120 does not come from the satellite 16, and the identification and positioning method 40 proceeds to operation 412. When the difference is not greater than the threshold, the processor 280 determines that there is no attack event in which the to-be-identified broadcast GNSS signal 120 is the broadcast GNSS signal 160, i.e., the to-be-identified broadcast GNSS signal 120 comes from the satellite 16, and the identification and positioning method 40 proceeds to operation 414.

In operation 412, the processor 280 performs positioning based on the ephemeris aiding data reference of Segment 3. That is, in response to the attack event in which the to-be-identified broadcast GNSS signal 120 is the spoofing signal 180, the processor 280 performs positioning based on the ephemeris aiding data reference rather than the to-be-identified ephemeris data of the to-be-identified broadcast GNSS signal 120.

In operation 414, the processor 280 performs positioning based on the to-be-identified ephemeris data of the to-be-identified broadcast GNSS signal 120.

In some scenarios, since the GNSS time of the to-be-identified broadcast GNSS signal 120 may also be tampered with by the attacker 18, the ephemeris aiding data reference selected based on the GNSS time of the to-be-identified broadcast GNSS signal 120 may be unreliable. Thus, the present application introduces another identification and positioning method. Details are described in the embodiments with FIG. 5.

Figure 5:
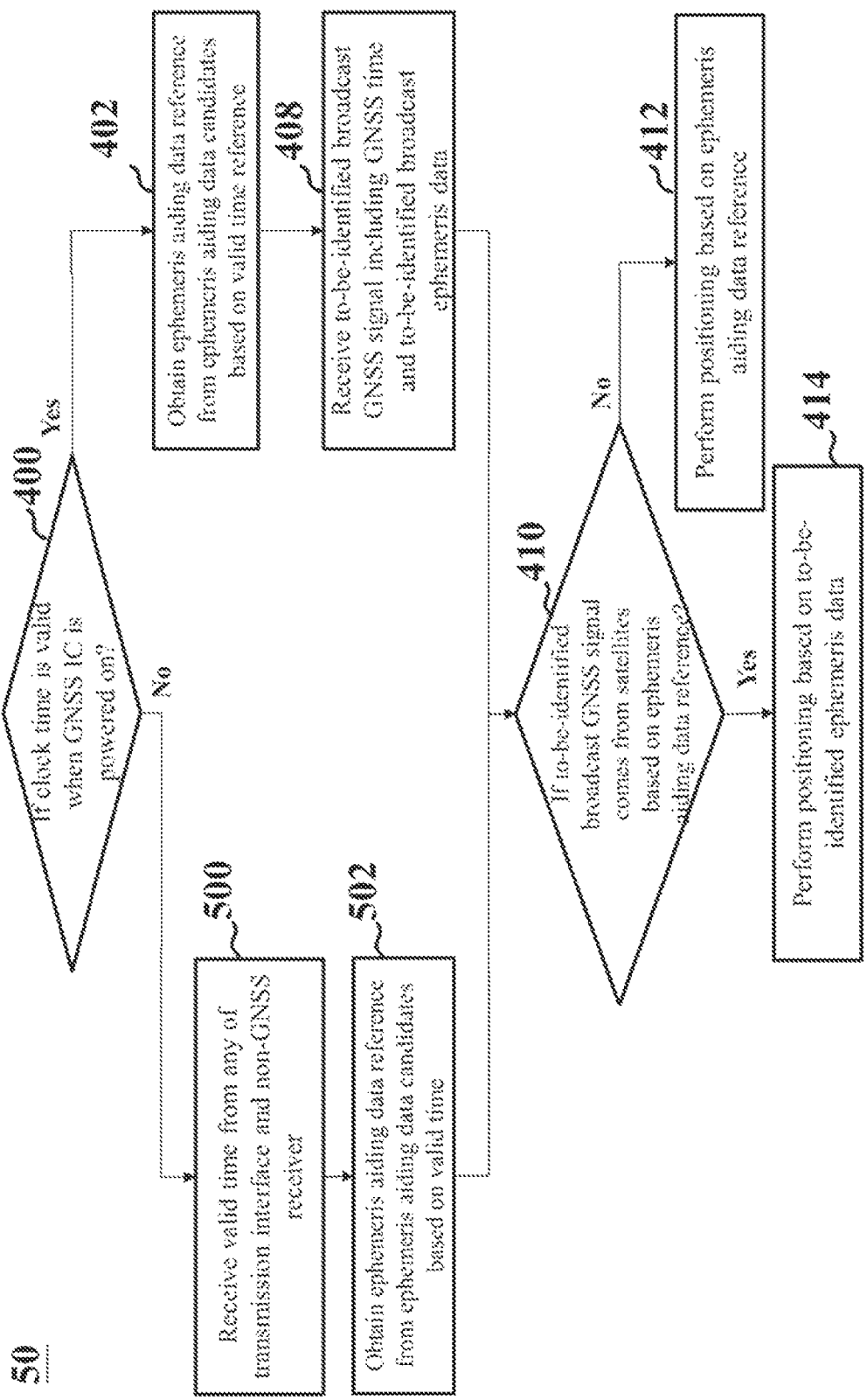
FIG. 5 is a flowchart illustrating another identification and positioning method in the present application.

FIG. 5 is a flowchart illustrating another identification and positioning method 50 in the present application. Referring to FIG. 5, the identification and positioning method 50 is similar to the identification and positioning method 40 shown in FIG. 4, except that the identification and positioning method 50 uses operations 500 and 502 to replace operations 404 and 406, respectively.

In operation 500, the processor 280 receives the valid time from any of the transmission interface 260 and the non-GNSS receiver 24. For example, a user may input the valid time to the GNSS IC 20 through an input interface (not shown in figures). Or, the GNSS IC 20 may obtain the valid time from a reliable website through such as a Wi-Fi device, etc.

In operation 502, the processor 280 obtains the ephemeris aiding data reference from the multiple ephemeris aiding data candidates 202 based on the valid time.

In some applications, the processor 280 is used to continuously identify whether the to-be-identified broadcast GNSS signal 120 received is a spoofing signal 180 as the time is running. However, it may occur that the current ephemeris aiding data reference is not suitable for authenticating the validity of the to-be-identified broadcast GNSS signal 120 because the current GNSS time is not within the reference time period of the current ephemeris aiding data reference. Therefore, it is required to add refreshing operations for obtaining the corresponding ephemeris aiding data. Details are described in the embodiments with FIG. 6.

Figure 6:
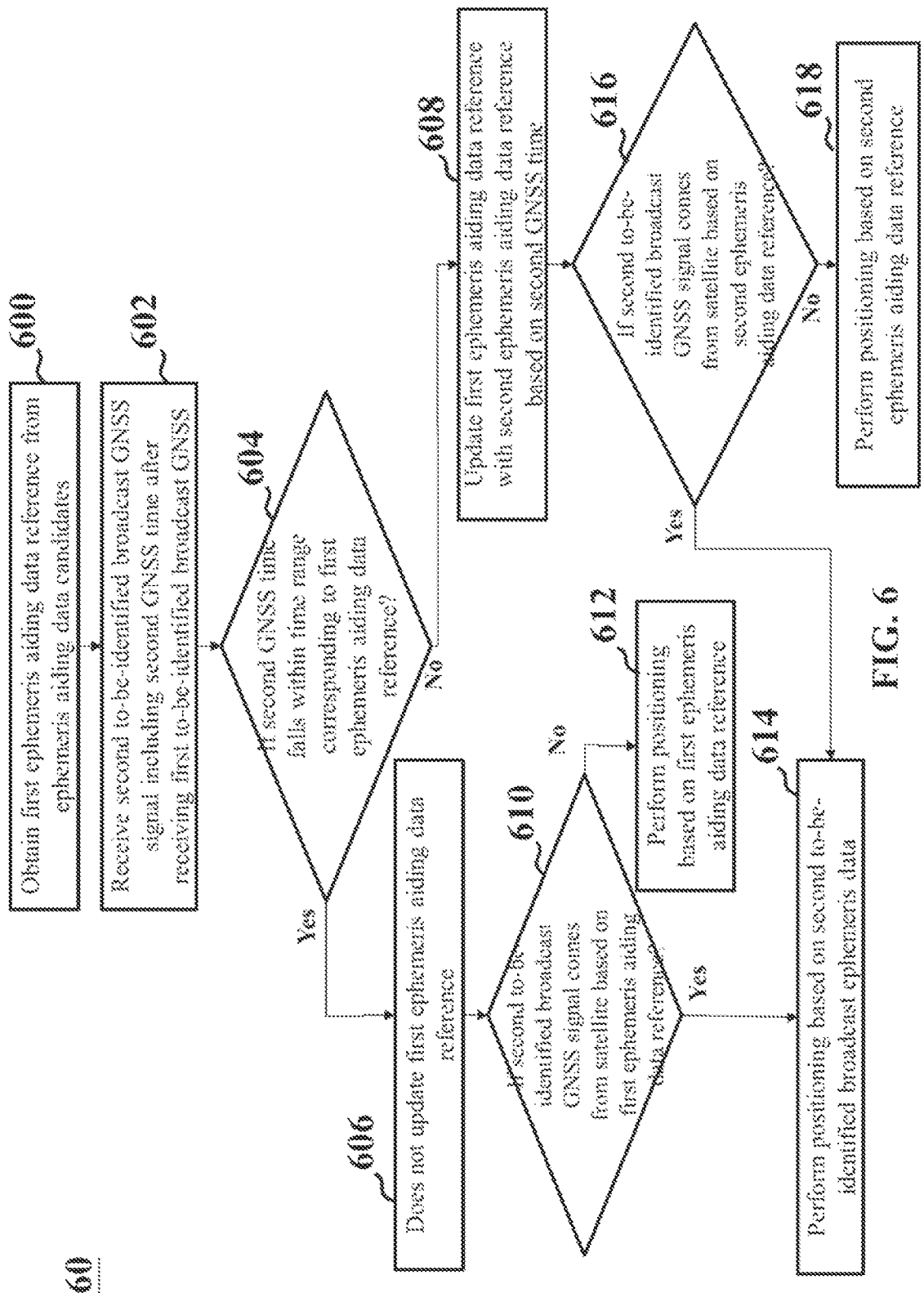
FIG. 6 is a flowchart illustrating still another identification and positioning method 60 in the present application.

FIG. 6 is a flowchart illustrating still another identification and positioning method 60 in the present application. Referring to FIG. 6, the identification and positioning method 60 includes operations 600, 602, 604, 606, 608, 610, 612, 614, 616 and 618.

In operation 600 similar to operation 402 shown in FIG. 4 or operation 502 shown in FIG. 5, the processor 280 obtains first ephemeris aiding data reference from the multiple ephemeris aiding data candidates 202. After that, referring back to operation 410 shown in FIG. 4, based on the first ephemeris aiding data reference, the judgment of whether the first to-be-identified broadcast GNSS signal comes from the satellite 16 is completed.

In operation 602, after receiving the first to-be-identified broadcast GNSS signal, the GNSS module 220 receives the second to-be-identified broadcast GNSS signal including the second GNSS time. In short, the signal reception time of the second one is later than the signal reception time of the first one.

In operation 604, the processor 280 determines whether the second GNSS time falls within the time range corresponding to the first ephemeris aiding data reference. For ease of understanding, suppose that the first ephemeris aiding data reference is the ephemeris aiding data reference in Segment 3 shown in FIG. 3B, and the corresponding time range is 12:00 to 18:00. If the second GNSS time is 17:30, then the second GNSS time falls within the time range corresponding to the first ephemeris aiding data reference, and the identification and positioning method 60 proceeds to operation 606. On the contrary, if the second GNSS time is 19:00, then the second GNSS time falls outside of the time range corresponding to the first ephemeris aiding data reference, and the identification and positioning method 60 proceeds to operation 608.

In operation 606, since the second GNSS time falls within the time range corresponding to the first ephemeris aiding data reference, the first ephemeris aiding data reference is still suitable in the identification of whether the second to-be-identified broadcast GNSS signal is the spoofing signal 180. Therefore, the processor 280 does not update the first ephemeris aiding data reference.

In operation 608, since the second GNSS time falls outside of the time range corresponding to the first ephemeris aiding data reference, the first ephemeris aiding data reference is not suitable in the identification of whether the second to-be-identified broadcast GNSS signal is the spoofing signal 180. Therefore, the processor 280 updates the ephemeris aiding data candidate 202 in Segment 3 shown in FIG. 3B with the ephemeris aiding data candidate 202 in Segment 4 shown in FIG. 3B as the ephemeris aiding data reference based on the second GNSS time 19:00. The ephemeris aiding data candidate 202 in Segment 4 is considered as the second. ephemeris aiding data reference.

In operation 610, the processor 280 determines whether the second to-be-identified broadcast GNSS signal comes from the satellite 16 based on the first ephemeris aiding data reference. The operation details are similar to operation 410 shown in FIG. 4, and will not be repeated here for brevity. When determining that the second to-be-identified broadcast GNSS signal is not from the satellite 16, the identification and positioning method 60 proceeds to operation 612. When determining that the second to-be-identified broadcast GNSS signal comes from the satellite 16, the identification and positioning method 60 proceeds to operation 614.

In operation 612, the processor 280 performs positioning based on the first ephemeris aiding data reference.

In operation 614, the processor 280 performs positioning based on the second to-be-identified broadcast ephemeris data.

In operation 616, the processor 280 determines whether the second to-be-identified broadcast GNSS signal comes from the satellite 16 based on the second ephemeris aiding data reference. The operation details are similar to operation 410 shown in FIG. 4, and will not be repeated here for brevity. When determining that the to-be-identified broadcast GNSS signal is not from the satellite 16, the identification and positioning method 60 proceeds to operation 618. When determining that the to-be-identified broadcast GNSS signal comes from the satellite 16, the identification and positioning method 60 proceeds to operation 614.

In operation 618, the processor 280 performs positioning based on the second ephemeris aiding data reference.

Some or all of the aforementioned embodiments of the method of the invention may be implemented in a computer program, such as digital signal processor (DSP) code in a specific programming language, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carder such as a DVD, CD-ROM, USB stick, a hard disk, which may be located in a network server accessible via a network such as the Internet, or any other suitable carrier.

Although the embodiment has been described as having specific elements in FIG. 2, it should be noted that additional elements may be included to achieve better performance without departing from the spirit of the invention. Each element of FIG. 2 is composed of various circuits and arranged operably to perform the aforementioned operations. While the process flows described in FIGS. 4 to 6 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A global navigation satellite system (GNSS) integrated circuit (IC), comprising:
   a GNSS circuitry, arranged operably to receive a to-be-identified broadcast GNSS signal;
   a memory, arranged operably to store a plurality of ephemeris aiding data candidates, wherein the ephemeris aiding data candidates are not provided by the GNSS circuitry; and
   a processor, arranged operably to determine whether the to-be-identified broadcast GNSS signal is a spoofing signal based on an ephemeris aiding data reference in the ephemeris aiding data candidates,
   wherein the GNSS IC comprises a valid time reference, and the processor is arranged operably to obtain the ephemeris aiding data reference from the ephemeris aiding data candidates based on the valid time reference.

2. The GNSS IC of claim 1, wherein the processor is arranged operably to determine that the to-be-identified broadcast GNSS signal is a spoofing signal when a difference between a parameter of the ephemeris aiding data reference, and the parameter of to-be-identified ephemeris data in the to-be-identified broadcast GNSS signal is greater than a threshold.

3. The GNSS IC of claim 2, wherein the processor is arranged operably to perform positioning based on the ephemeris aiding data reference rather than the to-be-identified ephemeris data in response to an attack event in which the to-be-identified broadcast GNSS signal is a spoofing signal.

4. The GNSS IC of claim 3, wherein the ephemeris aiding data candidates are provided by a Wi-Fi receiver.

5. The GNSS IC of claim 1, comprising:
   a real-time clock, arranged operably to provide a valid clock time,
   wherein the processor is arranged operably to consider the valid clock time as the valid time reference.

6. The GNSS IC of claim 1, comprising:
   a transmission interface,
   wherein the processor is arranged operably to receive a valid time through any of the transmission interface and the non-GNSS receiver, and consider the valid time as the valid time reference.

7. The GNSS IC of claim 1, wherein the processor is arranged operably to consider a GNSS time of the to-be-identified broadcast GNSS signal as the valid time reference.

8. The GNSS IC of claim 1, wherein the to-be-identified broadcast GNSS signal is a first to-be-identified broadcast GNSS signal, and the ephemeris aiding data reference is a first ephemeris aiding data reference,
   wherein the GNSS circuitry is arranged operably to receive a second to-be-identified broadcast GNSS signal comprising a second GNSS time after receiving the first to-be-identified broadcast GNSS signal,
   wherein the processor is arranged operably to treat one of ephemeris aiding data candidates except for the first ephemeris aiding data reference as a second ephemeris aiding data reference based on the second GNSS time when the second GNSS time falls outside of a time range corresponding to the first ephemeris aiding data reference,
   wherein the processor is arranged operably to determine whether the second to-be-identified broadcast GNSS signal is a spoofing signal based on the second ephemeris aiding data reference.

9. A communication system, comprising:
   a global navigation satellite system (GNSS) integrated circuit (IC), comprising:
      a GNSS circuitry, arranged operably to receive a to-be-identified broadcast GNSS signal;
      a memory, arranged operably to store a plurality of ephemeris aiding data candidates, wherein the ephemeris aiding data candidates are not provided by the GNSS circuitry; and
      a processor, arranged operably to determine whether the to-be-identified broadcast GNSS signal is a spoofing signal based on an ephemeris aiding data reference in the ephemeris aiding data candidates;
   an antenna, coupled to the GNSS IC,
   wherein the GNSS IC comprises a valid time reference, and the processor is arranged operably to obtain the ephemeris aiding data reference from the ephemeris aiding data candidates based on the valid time reference.

10. The communication system of claim 9, wherein the processor is arranged operably to determine that the to-be-identified broadcast GNSS signal is a spoofing signal when a difference between a parameter of the ephemeris aiding data reference, and the parameter of to-be-identified ephemeris data in the to-be-identified broadcast GNSS signal is greater than a threshold.

11. The communication system of claim 10, wherein the processor is arranged operably to perform positioning based on the ephemeris aiding data reference rather than the to-be-identified ephemeris data in response to an attack event in which the to-be-identified broadcast GNSS signal is a spoofing signal.

12. The communication system of claim 11, wherein the ephemeris aiding data candidates are provided by a Wi-Fi receiver.

13. The communication system of claim 9, wherein the GNSS IC comprises:
a real-time clock, arranged operably to provide a valid clock time,
wherein the processor is arranged operably to consider the valid clock time as the valid time reference.

14. The communication system of claim 9, wherein the GNSS IC comprises:
a transmission interface,
wherein the processor is arranged operably to receive a valid time through any of the transmission interface and the non-GNSS receiver, and consider the valid time as the valid time reference.

15. The communication system of claim 9, wherein the processor is arranged operably to consider a GNSS time of the to-be-identified broadcast GNSS signal as the valid time reference.

16. The communication system of claim 9, the to-be-identified broadcast GNSS signal is a first to-be-identified broadcast GNSS signal, and the ephemeris aiding data reference is a first ephemeris aiding data reference,
wherein the GNSS circuitry is arranged operably to receive a second to-be-identified broadcast GNSS signal comprising a second GNSS time after receiving the first to-be-identified broadcast GNSS signal,
wherein the processor is arranged operably to treat one of ephemeris aiding data candidates except for the first ephemeris aiding data reference as a second ephemeris aiding data reference based on the second GNSS time when the second GNSS time falls outside of a time range corresponding to the first ephemeris aiding data reference,
wherein the processor is arranged operably to determine whether the second to-be-identified broadcast GNSS signal is a spoofing signal based on the second ephemeris aiding data reference.

17. An identification and positioning method, performed by a global navigation satellite system (GNSS) integrated circuit (IC), comprising:
providing a plurality of ephemeris aiding data candidates, wherein the ephemeris aiding data candidates are not provided by a GNSS circuitry;
receiving a to-be-identified broadcast GNSS signal;
providing a valid time reference in the GNSS IC;
obtaining an ephemeris aiding data reference from the ephemeris aiding data candidates based on the valid time reference; and
determining whether the to-be-identified broadcast GNSS signal is a spoofing signal based on the ephemeris aiding data reference in the ephemeris aiding data candidates.

18. The identification and positioning method of claim 17, comprising:
determining that the to-be-identified broadcast GNSS signal is a spoofing signal when a difference between a parameter of the ephemeris aiding data reference, and the parameter of to-be-identified ephemeris data in the to-be-identified broadcast GNSS signal is greater than a threshold; and
performing positioning based on the ephemeris aiding data reference rather than the to-be-identified ephemeris data in response to an attack event in which the to-be-identified broadcast GNSS signal is a spoofing signal.

* * * * *